(12) United States Patent
Ramm-Schmidt et al.

(10) Patent No.: US 9,372,033 B2
(45) Date of Patent: Jun. 21, 2016

(54) HEAT EXCHANGE ELEMENT, A HEAT EXCHANGER COMPRISING THE ELEMENTS, AND AN EQUIPMENT FOR THE MANUFACTURE OF THE ELEMENTS

(75) Inventors: Leif Ramm-Schmidt, Espoo (FI); Arun Ganesaraman, Tamilnadu (IN)

(73) Assignee: ARVIND ACCEL LIMITED, Ahmedabad (IN)

( * ) Notice: Subject to any disclaimer, the term of this patent is extended or adjusted under 35 U.S.C. 154(b) by 534 days.

(21) Appl. No.: 13/583,025

(22) PCT Filed: Mar. 8, 2010

(86) PCT No.: PCT/FI2010/050172
§ 371 (c)(1),
(2), (4) Date: Dec. 21, 2012

(87) PCT Pub. No.: WO2011/110726
PCT Pub. Date: Sep. 15, 2011

(65) Prior Publication Data
US 2013/0146226 A1    Jun. 13, 2013

(51) Int. Cl.
*F28F 7/00* (2006.01)
*F28B 9/10* (2006.01)
(Continued)

(52) U.S. Cl.
CPC .............. *F28D 9/0087* (2013.01); *B01D 1/221* (2013.01); *B29C 65/18* (2013.01);
(Continued)

(58) Field of Classification Search
CPC ........ F28D 9/0087; F28F 3/14; B29C 66/221; B29C 66/8145; B29C 66/232
USPC ................... 165/111, 115, 46, 146, 166, 170; 156/73.5, 359
See application file for complete search history.

(56) References Cited

U.S. PATENT DOCUMENTS

| 3,831,246 A | 8/1974 | Morris |
| 5,340,443 A * | 8/1994 | Heinio et al. ................. 202/182 |

(Continued)

FOREIGN PATENT DOCUMENTS

| DE | 1259362 B * | 1/1959 |
| DE | 1259362 B | 1/1968 |

(Continued)

OTHER PUBLICATIONS

Translation of German Patent Document DE1259362B named TRANS-DE1259362B.*

(Continued)

*Primary Examiner* — M. Alexandra Elve
*Assistant Examiner* — Paul Alvare
(74) *Attorney, Agent, or Firm* — Young & Thompson

(57) ABSTRACT

A heat exchange element of flexible plastic film, a heat exchanger including such elements, and apparatus for manufacturing the elements. The element includes a pair of opposite film sheets bonded by welds to form an expandable bag with inside and outside heat exchange surfaces, an inlet opening for supplying a pressurized heat exchange fluid to the bag, an outlet opening for discharging the fluid from the bag after heat exchange, and an array of welds defining routes for fluid flow inside the bag. There are spot welds in a first zone of the element, parallel extended welds in a second zone of the element, defining fluid flow channels through the second zone, and oblique welds in a third zone of the element, defining channels for fluid flow towards the outlet opening. The heat exchanger includes adjacent elements for heat exchange between a pressurized first fluid.

16 Claims, 3 Drawing Sheets

Figure 1:
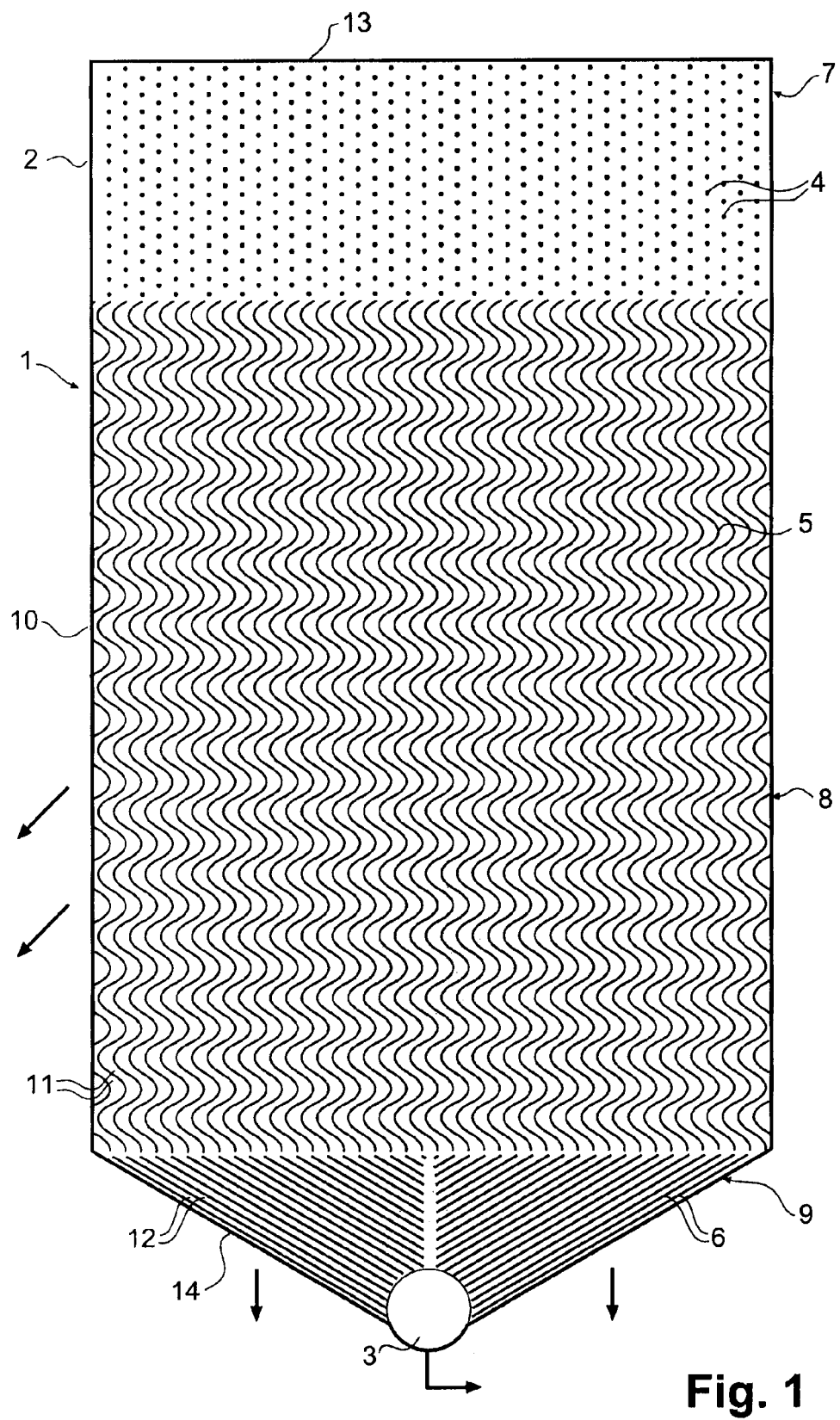

(51) Int. Cl.

| | | |
|---|---|---|
| *F28D 5/02* | (2006.01) | |
| *F28F 13/00* | (2006.01) | |
| *F28F 3/00* | (2006.01) | |
| *F28F 3/14* | (2006.01) | |
| *B29C 65/06* | (2006.01) | |
| *B29C 65/00* | (2006.01) | |
| *B32B 37/00* | (2006.01) | |
| *B32B 41/00* | (2006.01) | |
| *B65C 9/40* | (2006.01) | |
| *G05G 15/00* | (2006.01) | |
| *F28D 9/00* | (2006.01) | |
| *B01D 1/22* | (2006.01) | |
| *B29C 65/18* | (2006.01) | |
| *B29D 7/01* | (2006.01) | |
| *F28F 3/12* | (2006.01) | |
| *F28F 21/06* | (2006.01) | |
| *B29L 22/02* | (2006.01) | |
| *B29L 31/18* | (2006.01) | |
| *B29L 31/00* | (2006.01) | |

(52) U.S. Cl.
CPC .......... *B29C 66/1122* (2013.01); *B29C 66/21* (2013.01); *B29C 66/221* (2013.01); *B29C 66/232* (2013.01); *B29C 66/41* (2013.01); *B29C 66/81433* (2013.01); *B29C 66/81435* (2013.01); *B29C 66/81465* (2013.01); *B29C 66/83413* (2013.01); *B29C 66/83415* (2013.01); *B29D 7/01* (2013.01); *F28F 3/12* (2013.01); *F28F 21/065* (2013.01); *B29C 66/8242* (2013.01); *B29L 2022/02* (2013.01); *B29L 2031/18* (2013.01); *B29L 2031/7128* (2013.01); *F28F 2255/02* (2013.01)

(56) References Cited

U.S. PATENT DOCUMENTS

| | | | |
|---|---|---|---|
| 5,770,020 A | | 6/1998 | Koistinen et al. |
| 5,904,807 A | * | 5/1999 | Ramm-Schmidt et al. .. 159/43.1 |
| 5,927,383 A | * | 7/1999 | Ramm-Schmidt et al. ..... 165/46 |
| 6,068,730 A | * | 5/2000 | Ramm-Schmidt et al. .. 159/43.1 |
| 6,241,010 B1 | | 6/2001 | Ramm-Schmidt et al. |
| 6,547,000 B1 | | 4/2003 | Rantala et al. |
| 6,966,974 B1 | * | 11/2005 | Ramm-Schmidt et al. ..... 203/23 |
| 2005/0039898 A1 | * | 2/2005 | Wand et al. .................. 165/167 |

FOREIGN PATENT DOCUMENTS

| | | |
|---|---|---|
| DE | 25 11 144 | 9/1976 |
| DE | 2700221 A1 | 7/1978 |
| EP | 0034920 A1 | 9/1981 |
| EP | 0286399 A1 | 10/1988 |
| EP | 0460872 A1 | 12/1991 |
| JP | S56130289 A | 10/1981 |
| JP | H04227481 A | 8/1992 |
| JP | 2001502044 | 2/2001 |
| JP | 2004506173 A | 2/2004 |
| WO | 8000920 A1 | 5/1980 |
| WO | 90/01977 | 3/1990 |
| WO | 92/10264 | 6/1992 |
| WO | 92/10265 | 6/1992 |
| WO | 98/33029 | 7/1998 |
| WO | 9831529 A1 | 7/1998 |
| WO | 0212815 A1 | 2/2002 |

OTHER PUBLICATIONS

European Search Report, dated Jun. 24, 2014, from corresponding EP application.
International Search Report dated Nov. 24, 2010, corresponding to PCT/FI2010/050172.

* cited by examiner

HEAT EXCHANGE ELEMENT, A HEAT EXCHANGER COMPRISING THE ELEMENTS, AND AN EQUIPMENT FOR THE MANUFACTURE OF THE ELEMENTS

The invention relates to a heat exchange element of flexible plastic film material, a heat exchanger comprising a plurality of such heat exchange elements, as well as an equipment for the manufacture of the heat exchange elements.

More particularly, the invention comprises a heat exchange element of flexible plastic film material bonded to form an expandable bag with inside and outside heat exchange surfaces, the element comprising an inlet opening for supplying a pressurized heat exchange fluid flow, an outlet opening for discharging the fluid flow after heat exchange, and an array of welds bonding the opposite plastic films to define routes for vertical fluid flow through subsequent heat exchange zones inside the bag. The heat exchanger according to the invention has a pack of such heat exchange elements, with the pressurized heat exchange fluid arranged to be fed inside each of the elements, and another heat exchange fluid flow arranged to be fed to each of the gaps left between the elements. An example of such a heat exchanger is a distiller, which evaporates liquid flowing between the elements and, after pressurizing of the vapor, condenses it back to liquid inside the elements.

In the prior art, WO 90/01977 describes a distillation apparatus consisting of a pack of upright heat exchange elements comprised of pairs of plastic film membranes, which have spot welds between the membranes to define passages for heat exchange fluid flow. Water to be distilled is led from a distributor basin above the elements to the outer surfaces of the adjacent elements, evaporated between the elements, and the vapor is then collected and sucked to a blower, which blows it inside the elements at a higher pressure. The heat exchange between the inside and the outside of the adjacent elements condenses the vapor back to liquid. Each element has a vapor inlet opening extending along a vertical side edge in the upper part of the element, and a liquid outlet opening in the lowermost corner of a sloping bottom of the element. The apparatus is aimed at the production of fresh water from saline sea water.

WO 92/10264 and WO 92/10265 show a modification of the distillation apparatus according to WO 90/01977, in which both the liquid to be evaporated between the bag-like heat exchange elements and the pressurized vapor to be condensed in the inside of the elements are supplied through distributor strips at the top end of the adjacent elements. Another change is that the inside of each element has been divided to parallel vertical, zigzagging fluid flow channels, by means of correspondingly zigzagging weld lines between the pair of film membranes defining the element.

WO 98/33029 shows as another modification a bag-like heat exchange element with sinuous welds defining correspondingly sinuous flow channels for fluid flow inside the element. The welds extend from the top end of each element to a tapered bottom, collecting the fluid condensed within the element to a centrally located discharge opening. The apparatus is meant for the evaporation of industrial waste water with a content of suspended solid matter, separating as a residue, which passes the relatively narrow condensate discharge openings and thus provides for self-cleaning taking place in the evaporator.

DE 25 11 144 describes an evaporator, in which vertical heat exchange elements of plastic material comprise a spot welded vapour distributor zone and a horizontally and vertically channelled heat exchange zone located beside each other. Hot vapour is supplied from a vertical side of the evaporator to the inside of each element, passed through the spot welded vapour distributor zone, and led to the horizontal and vertical channels of the heat exchange zone, to be condensed and discharged as condensed liquid through an outlet opening at the bottom of the element. A solution to be evaporated is supplied from the top of the evaporator to the outer surfaces of the heat exchange elements, to flow downward and evaporate between the expanded horizontal and vertical channels of the heat exchange zone.

In comparison with the spot welds the sinuous or zigzagging welds have the benefit of forming pathways for fluid flow between the elements which are not easily clogged, especially if the elements are arranged so as to have every second element turned to a mirror-image position in regard of the neighbouring elements. In such an arrangement the expanded sinuous flow channels of the neighbouring elements regularly cross each other, and form pathways outside the elements, which crisscross around those sinuous expansions. Spot welds, especially in a face-to face position in neighbouring elements tend to thin down the pathways between the expanded elements and suppress the fluid flow. As fibrous suspensions are evaporated the flow pathways are easily clogged. The sinuous weld configuration can also withstand higher pressure differences than spot welds and provides superior liquid distribution.

A drawback of the sinuous weld configurations of the prior art heat exchangers is that the fluid flow distribution structures at the top of the elements are bulky, due to the double feed channel arrangements supplying the fluid flows to the inside and to the outside of each element, respectively. The thickness of the double feed channel structure then sets a minimum for the expansion of the elements, so as to bring the surfaces of the neighbouring elements into contact with each other. Therefore restricting the expansion in order to increase the number of heat exchange surfaces and thereby the heat exchanging capacity in a given volume is not possible.

The goal of the invention is to provide an improved heat exchange element, in which the above drawbacks have been avoided. In other words, the invention aims at an easy flow of fluids between adjacent heat exchange elements while the elements have a high resistance to wear under high pressure conditions and an improved capacity due to restricted expansion and increased heat exchange surface area. The solution provided by the invention is a heat exchange element, in which there is an array of spot welds in an uppermost first zone of the element adjacent to the inlet opening, an array of parallel extended welds in a second zone of the element below said first zone, said extended welds defining fluid flow channels through the second zone, and an array of oblique welds in a lowermost third zone of the element below said second zone, said oblique welds defining channels for fluid flow towards the outlet opening.

Spot welds in the uppermost first zone of the element permit a free lateral spread of fluid, usually pressurized vapor, which is thereby evenly distributed to the flow channels in the second zone below. The vapor inlet opening can thus be located on a vertical side of the element, separated from the inlet channels which feed a fluid to the outside of the elements. The thickness of the feed channel structure at the top end of the elements is only determined by the latter, resulting in a lesser expansion of individual elements required to bring the element surfaces into contact with each other. Furthermore, by increasing the number of spot welds the expansion in the first zone can be reduced and made to be less than in the second zone, which would improve the fluid flow between the uppermost parts of the adjacent elements.

According to a preferred embodiment of the invention the element comprises an array of parallel sinuous welds defining parallel sinuous fluid flow channels extending vertically through the second zone of the element. However, the invention even covers linear welds in the second zone, useful particularly in a gas-to-gas heat exchanger.

The first and second zones of the heat exchange element may be generally rectangular, whereas the third zone is tapering towards the outlet opening. In the heat exchanger the heat exchange elements are usually standing in an upright position, and the outlet opening is lying at the lowermost end of the element, with the fluid flow channels in the third zone converging towards the outlet opening.

The heat exchanger according to the invention comprises a pack of adjacent heat exchange elements of flexible plastic film material, each element having the form of an expandable bag with inside and outside heat exchange surfaces to enable heat exchange between a pressurized first fluid flowing inside the elements and a second fluid flowing between the adjacent elements, and each element comprising an inlet opening for supplying said first fluid, an outlet opening for discharging the first fluid after heat exchange, and an array of welds bonding the opposite plastic films to define routes for vertical fluid flow through subsequent heat exchange zones inside the bag. The heat exchanger of the invention is characterized in that in each heat exchange element there is an array of spot welds in an uppermost first zone of the element adjacent to the inlet opening, an array of parallel extended welds in a second zone of the element below said first zone, said extended welds defining fluid flow channels through the second zone, and an array of oblique welds in a lowermost third zone of the element below said second zone, said oblique welds defining channels for fluid flow towards the outlet opening.

The equipment for the manufacture of heat exchange elements according to the invention is characterized in that it comprises a path of travel for a web of double plastic sheet material for provision of a plurality of bag-like elements, a succession of three heatable weld rolls along said path, said three rolls having protrusions for forming welds of three specific different configurations, respectively, and being provided with hydraulic or pneumatic means to selectively bringing the rolls into contact with the moving web and out of contact with it, and a backing roll on the opposite side of the web supporting the weld rolls brought into contact with the web.

Figure 2:
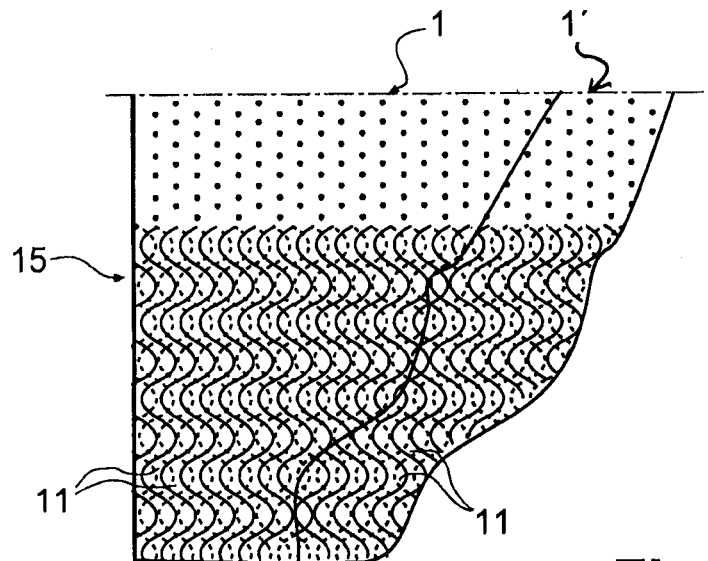
Figure 3:
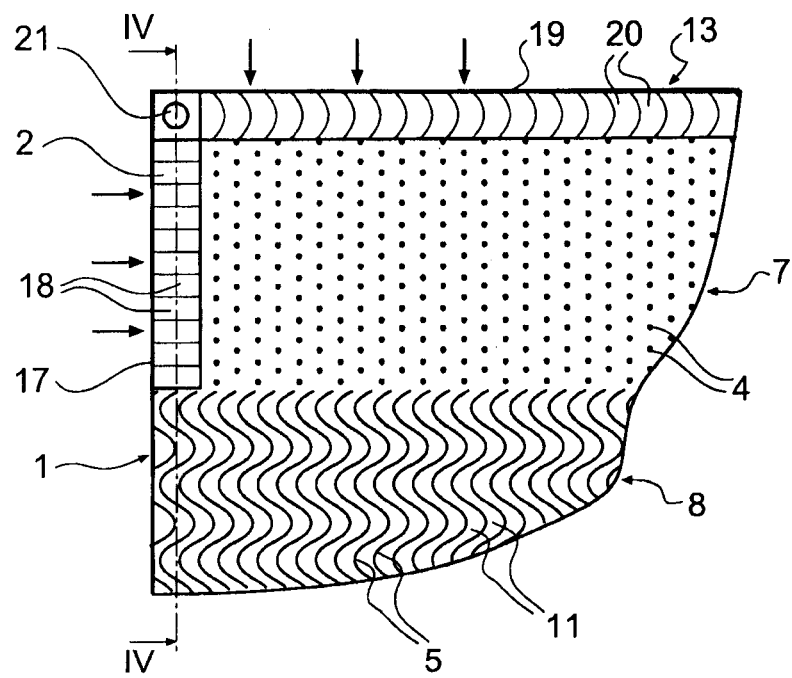
Figure 4:
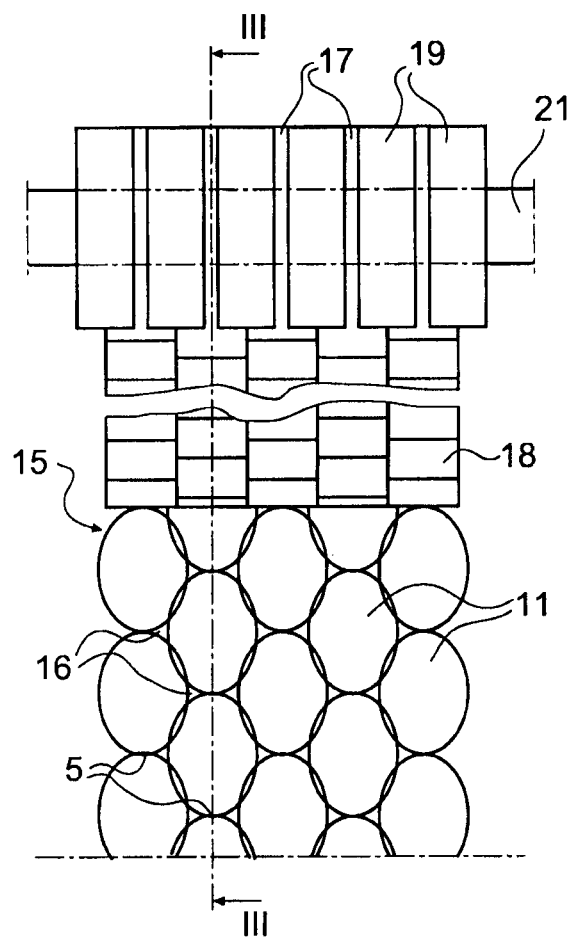
Figure 5:
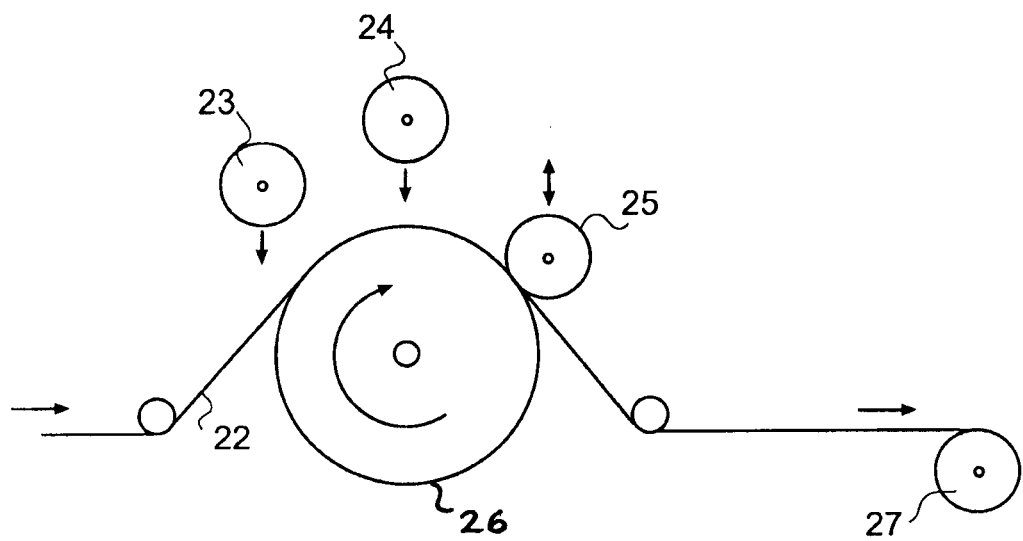

The invention is now described in more detail by way of examples with reference to the attached drawings, in which FIG. 1 is a front view of a heat exchange element according to the invention, FIG. 2 is a partial front view of two adjacent heat exchange elements according to FIG. 1, partly in section, FIG. 3 is a front view of the upper left corner of an element according to claim 1, as section IV-IV from FIG. 4, including inlet channels for the heat exchange fluids, FIG. 4 is a cross-section of part of a heat exchanger comprising a pack of heat exchange elements according to FIG. 1, as section III-III from FIG. 3, and FIG. 5 is a schematic illustration of an equipment for the manufacture of heat exchange elements according to the invention, FIG. 1 shows a heat exchange element 1 comprising a pair of sheets of flexible plastic film material bonded to form an expandable bag with inside and outside heat exchange surfaces. The element 1 belongs to a heat exchanger comprising a pack of adjacent elements bound to each other by clamping means. One of the heat exchange fluids is pressurized gas or vapor flowing inside the elements 1 and expanding the elements so as to press the heat exchange film surfaces of adjacent elements into contact with each other. The other heat exchange fluid flows between the elements 1, along the outer heat exchange surfaces thereof.

The heat exchange element 1 according to FIG. 1 comprises an inlet opening 2 for supplying a pressurized heat exchange fluid flow, an outlet opening 3 for discharging the fluid flow after heat exchange, and an array of welds 4, 5, 6 bonding the opposite plastic film sheets to define routes for fluid flow inside the bag. The element is divided into three zones 7, 8, 9 in the direction of travel of the fluid inside the elements, generally downward in an element positioned vertically, the zones having welds of different configuration bonding the film sheets to each other and defining routes for fluid flow inside the element. In the first zone 7 adjacent to the inlet opening 2 there is an array of spot welds 4, permitting spread of the fluid in a lateral direction. The inlet opening 2 is located on a vertical side 10 of the element beside the first zone 7. In the second zone 8 following the first zone 7 there is an array of parallel sinuous welds 5 defining correspondingly sinuous fluid flow channels 11 extending vertically through the second zone. In the third zone 9 following the second zone 8 there is an array of oblique welds 6 defining channels 12 for fluid flow converging towards the lowermost outlet opening 3. In the area of the first and second zones 7, 8 the form of the element 1 is rectangular, having a horizontal top end 13 and vertical side edges 10, whereas in the third zone 9 the bottom 14 of the element tapers symmetrically towards the axially lowermost outlet opening 3.

FIG. 2 shows parts of two adjacent heat exchange elements 1, 1' as positioned in a pack of elements constituting a heat exchanger 15 according to the invention. It may be seen that the sinuous flow channels 11 of the neighbouring elements 1, 1' are in a mutually displaced or mirror-image position, so that the expanded channels regularly cross each other and leave pathways 16 outside the elements, which crisscross around the channels. FIG. 4 showing a pack of elements in cross-section is a further illustration of the mutual position of the expanded channels 11 in neighbouring elements 1, 1'.

As seen in FIGS. 3 and 4 the inlet opening 2 of each heat exchange element 1 is provided with a vertical bar 17 comprising a set of pressurized fluid feed channels 18 leading to the first zone 7 having spot welds 4. Along the top ends 13 of the elements there is a horizontal fluid distributor structure comprising adjacent bars 19, each with a set of feed channels 20, which distribute heat exchange fluid onto the heat exchange surfaces between the elements. The ends of the vertical and horizontal bars 17, 19 are stacked in alternation and bound together by means of a bolt 21 penetrating each of the elements in the pack.

A heat exchanger with a pack of heat exchange elements according to FIG. 1 may be used as a distiller, in which liquid is evaporated between the adjacent elements, the vapour generated from the liquid is raised to a higher pressure and temperature by means of a blower (not shown), and the vapor is then condensed back to liquid inside the elements and discharged from the elements as distillate. Other possible uses are heat exchange from a gas of a higher temperature to a gas of a lower temperature, the gas with the higher pressure flowing within the elements and the gas with the lower pressure flowing between the elements, and evaporation of fibrous or other suspensions to reduce their volume and separate their solid contents as the fluid flows in the gaps and pathways between the compressed elements, the solids being removed therefrom by way of a self-cleaning effect.

An equipment for the manufacture of the heat exchange elements 1 is depicted schematically in FIG. 5. The equipment has a path of travel for a web 22 of double plastic sheet material for provision of a plurality of bag-like elements, a succession of three heatable weld rolls 23, 24, 25 along said path, the three rolls having protrusions for forming welds of three different configurations, respectively, and being provided with hydraulic or pneumatic means (not shown) to selectively bring the rolls into contact with the moving web and out of contact with it, and a backing roll 26 on the opposite side of the web supporting the weld rolls brought into contact with the web. To produce an element as seen in FIG. 1 the three rolls have protrusions for forming welds of spot, sinuous and converging configuration, respectively. The welded plastic sheet web is taken up to roll 27, and cut to individual elements 1 at a later stage.

The invention claimed is:

1. A heat exchange element (1) comprising:
   flexible plastic film material bonded to form an expandable bag with inside and outside heat exchange surfaces, said expandable bag comprising:
   i) an inlet opening (2) operably connected with means for supplying a pressurized heat exchange fluid flow, said inlet opening (2) passing the pressurized heat exchange fluid to an inside of the element,
   ii) an outlet opening (3) adapted for discharging the fluid flow after heat exchange,
   iii) an array of welds (4-6) bonding the opposite plastic films to define routes for vertical fluid flow through subsequent heat exchange zones inside the bag, the array of welds consisting of
   a) an array of spot welds (4) in an uppermost first zone (7) of the element adjacent to the inlet opening (2), the uppermost first zone being free of straight oblique welds, and
   b) an array of parallel extended sinuous welds (5) in a second zone (8) of the element below said first zone, said extended sinuous welds defining parallel sinuous fluid flow channels (11) through the second zone, and
   c) an array of oblique welds (6) in a lowermost third zone (9) of the element below said second zone, said oblique welds defining channels (12) for fluid flow towards the outlet opening (3), the oblique welds and said defined channels (12) being arranged on either side about a center axis of the heat exchanger at dissimilar angles, both sides in parallel with a respective outer surface of the heat exchanger.

2. Heat exchange element according to claim 1, characterized in that the first and second zones (7, 8) of the heat exchange element (1) are rectangular, whereas the third zone (9) is tapering towards the outlet opening (3).

3. Heat exchange element according to claim 2, characterized in that the outlet opening (3) lies axially at the lowermost end of the element (1) set in an upright position, the fluid flow channels (12) in the third zone (9) converging towards the outlet opening.

4. Heat exchange element according to claim 3, characterized in that the upright element has a horizontal top end (13), two vertical sides (10) and a tapering bottom end (14) with the outlet opening (3), the inlet opening (2) lying on a vertical side beside said first zone (7).

5. Heat exchange element according to claim 1, characterized in that the element (1) condenses pressurized vapor or humidity to liquid, which is discharged from the lowermost outlet opening (3) of the element.

6. Heat exchanger (15) comprising a pack of adjacent heat exchange elements (1) of flexible plastic film material, each element having the form of an expandable bag with inside and outside heat exchange surfaces to enable heat exchange between a pressurized first fluid flowing inside the elements and a second fluid flowing between the adjacent elements (1, 1'), and on each element comprising an inlet opening (2) operably connected with means for supplying said pressurized first fluid, said inlet opening passing the pressurized first fluid to an inside of the element, an outlet opening (3) adapted for discharging the first fluid after heat exchange, and an array of welds (4, 5, 6) bonding the opposite plastic films to define routes for vertical fluid flow through subsequent heat exchange zones inside the bag, and each heat exchange element (1) there are bonds consisting of an array of spot welds (4) in an uppermost first zone (7) of the element adjacent to the inlet opening (2), the uppermost first zone being free of straight oblique welds, an array of parallel extended sinuous welds (5) in a second zone (8) of the element below said first zone, said extended sinuous welds defining parallel sinuous fluid flow channels (11) through the second zone, and an array of oblique welds (6) in a lowermost third zone (9) of the element below said second zone, said oblique welds defining channels (12) for fluid flow towards the outlet opening (3), the oblique welds and said defined channels (12) being arranged on either side about a center axis of the heat exchanger at dissimilar angles, both sides in parallel with a respective outer surface of the heat exchanger.

7. A heat exchanger according to claim 6, wherein the sinuous welds and sinuous flow channels of the neighbouring heat exchange elements are in a mirror-image position.

8. Heat exchanger according to claim 6, characterized in that the first and second zones (7, 8) of each heat exchange element (1) are rectangular, whereas the third zone (9) is tapering towards the outlet opening (3).

9. Heat exchanger according to claim 8, characterized in that the heat exchange elements (1) are in an upright position and the outlet opening (3) is at the lowermost end of each element.

10. Heat exchanger according to claim 9, characterized in that each heat exchange element (1) has a horizontal top end (13), two vertical sides (10) and a tapering bottom end (14) with the outlet opening (3), the inlet opening (2) lying on a vertical side beside said first zone (7).

11. Heat exchanger according to claim 10, characterized in that there is a horizontal fluid distributor structure (19) adjacent to the top ends (13) of the heat exchange elements (1), said structure comprising feed channels (20) distributing fluid onto the heat exchange surfaces between the elements.

12. Heat exchanger according to claim 11, characterized in that the fluid distributor structure comprises horizontal bars (19) containing a set of fluid feed channels (20), the bars being arranged in alternation with the top ends (13) of the flexible heat exchange elements (1).

13. Heat exchanger according to claim 12, characterized in that the inlet opening (2) of each heat exchange element (1) is provided with a vertical bar (17) comprising a set of vapor feed channels (18), said horizontal and vertical bars (19, 17) having their adjacent ends stapled and bound to each other in alternation.

14. Heat exchanger according to claim 9, characterized in that it condenses pressurized vapor or humidity to liquid, which is discharged from the lowermost outlet openings (3) of the heat exchange elements (1).

15. Heat exchanger according to claim 14, characterized in that it is a distiller evaporating liquid between the adjacent heat exchange elements (1, 1'), pressurizing the vapour generated from said liquid, and condensing the vapor back to liquid inside the heat exchange elements.

16. Equipment for the manufacture of heat exchange elements (1) comprising:

a succession of three heatable weld rolls (23-25) positioned along a path of travel for a web (22) of double plastic sheet material for provision of a plurality of bag-like elements, said three rolls having protrusions for forming welds of spot, sinuous, and converging configurations, respectively, and hydraulic or pneumatic means to selectively bring the weld rolls into contact with the moving web and out of contact with the moving web, and a backing roll (26) on an opposite side of the web supporting the weld rolls brought into contact with the web, wherein said equipment is operable to produce the heat exchange element (1) comprising flexible plastic film material bonded to form an expandable bag with inside and outside heat exchange surfaces, said element comprising i) an inlet opening (2) for supplying a pressurized heat exchange fluid flow to an inside of the element, ii) an outlet opening (3) adapted for discharging the fluid flow after heat exchange, and iii) an array of welds (4-6) bonding the opposite plastic films to define routes for vertical fluid flow through subsequent heat exchange zones inside the bag, and the array of welds consisting of a) an array of spot welds (4) in an uppermost first zone (7) of the element adjacent to the inlet opening (2), the uppermost first zone being free of straight oblique welds, b) an array of parallel extended sinuous welds (5) in a second zone (8) of the element below said first zone, said extended sinuous welds defining parallel sinuous fluid flow channels (11) through the second zone, and c) an array of oblique welds (6) in a lowermost third zone (9) of the element below said second zone, said oblique welds defining channels (12) for fluid flow towards the outlet opening (3), the oblique welds and said defined channels (12) being arranged on either side about a center axis of the heat exchanger at dissimilar angles, both sides in parallel with a respective outer surface of the heat exchanger.

\* \* \* \* \*